(12) United States Patent
Hallbert et al.

(10) Patent No.: US 7,796,035 B2
(45) Date of Patent: Sep. 14, 2010

(54) METHOD FOR SETTING A PROGRAMMABLE ALLOWED MOVEMENT TIME ON AN ASSET PROTECTION DEVICE

(75) Inventors: William E Hallbert, Stony Brook, NY (US); Ralph Scena, Lake Grove, NY (US); Lewin Edwards, Forest Hills, NY (US)

(73) Assignee: Honeywell International Inc., Morristown, NJ (US)

( * ) Notice: Subject to any disclaimer, the term of this patent is extended or adjusted under 35 U.S.C. 154(b) by 966 days.

(21) Appl. No.: 11/603,387

(22) Filed: Nov. 22, 2006

(65) Prior Publication Data
US 2008/0117072 A1    May 22, 2008

(51) Int. Cl.
G08B 13/14    (2006.01)
G08B 29/00    (2006.01)
G08B 1/00    (2006.01)

(52) U.S. Cl. .............. 340/568.1; 340/506; 340/309; 340/669

(58) Field of Classification Search ............ None
See application file for complete search history.

(56) References Cited

U.S. PATENT DOCUMENTS

| | | | |
|---|---|---|---|
| 5,515,032 A | 5/1996 | Johnson | |
| 5,898,368 A * | 4/1999 | Handley et al. | 340/514 |
| 5,963,131 A * | 10/1999 | D'Angelo et al. | 340/568.1 |
| 6,411,828 B1 | 6/2002 | Lands et al. | |
| 6,472,993 B1 * | 10/2002 | Addy | 340/686.1 |
| 6,593,850 B1 * | 7/2003 | Addy | 340/501 |
| 6,724,316 B2 * | 4/2004 | Addy et al. | 340/686.1 |
| 6,983,140 B2 * | 1/2006 | Higuchi | 455/421 |
| 7,268,680 B2 * | 9/2007 | Gary, Jr. | 340/539.15 |
| 2003/0014660 A1 | 1/2003 | Verplaetse et al. | |
| 2004/0066302 A1 | 4/2004 | Menar et al. | |
| 2004/0155777 A1 * | 8/2004 | Mitchell et al. | 340/568.1 |
| 2006/0109114 A1 * | 5/2006 | Watts et al. | 340/568.1 |
| 2006/0119476 A1 | 6/2006 | Hope et al. | |
| 2007/0040678 A1 | 2/2007 | Kojo | |

* cited by examiner

*Primary Examiner*—Daniel Wu
*Assistant Examiner*—Fekadeselassie Girma
(74) *Attorney, Agent, or Firm*—Barkume & Associates, P.C.

(57) ABSTRACT

A method and apparatus for generating an alarm signal upon detecting movement of an object over a time that is greater than a field settable allowed movement time. The method includes the steps of locating a housing with respect to the object, setting the allowed movement time for the object, monitoring the movement of the housing, detecting a movement that exceeds the allowed movement time of the housing, generating an alarm signal, and transmitting by wireless transmission the alarm signal to a remote receiving station. Setting the movement time for the object is achieved by the following steps: powering the apparatus while depressing a tamper switch, initiating a time counter, moving the object an acceptable distance, releasing the tamper switch, stopping the time counter, and reading the allowed movement time from the time counter. Detecting a movement greater than the allowed movement time includes the steps of detecting a movement of the housing, enabling an allowed movement time counter to count down the allowed movement time, enabling a restore counter to count down a restore time, detecting movement of the housing during the restore time, allowing the allowed movement time counter to continue to count down the allowed movement time, and determining when the allowed movement time counter has completed counting the allowed movement time.

15 Claims, 4 Drawing Sheets

METHOD FOR SETTING A PROGRAMMABLE ALLOWED MOVEMENT TIME ON AN ASSET PROTECTION DEVICE

TECHNICAL FIELD

This invention relates to the use of an asset protection alarm device for sensing movement and signaling an alarm signal, and in particular to the use of a field selectable allowed movement time that allows a user to move an asset for a distance without setting off an alarm.

BACKGROUND ART

Alarm devices for asset protection are typically mounted to the asset and monitor the asset's movement, transmitting an alarm signal if the movement is greater than a factory selected tolerance. As in U.S. Pat. No. 6,724,316 B2, which is incorporated herein by reference, the alarm device monitors the asset's movement by determining if there has been a change in the gravitational field of the sensor with respect to the earth's gravitation field or alternatively if there has been a change in the magnetic field of the sensor with respect to the earth's magnetic field. The alarm device periodically samples the sensed field and compares the samples to a calculated threshold. The calculated threshold is determined from an initial or at rest sample and a factory selected tolerance. The factory selected threshold prevents false triggers such as those that might be caused by noise spikes and the like.

For some assets it may be desirable to move the asset from one location to another within a premises without causing an alarm. An example would be a laptop computer in a library setting. To help with accessibility to their multiple patrons, the library may allow the computer to be moved from one desk to another, but would want to safeguard the laptop computer from being taken from the library. For this situation, it would be desirable for the library to be able to set the time that the asset could be moved so that the laptop computer could travel within the desk area without causing an alarm to sound. Alternatively the library may want to limit the laptop travel area to a section of the library without causing an alarm to sound. The travel distance and time for this situation is different and it would be desirable to customize the allowed travel distance for each situation. Similarly in an office setting, furniture protected by an alarm device may need to be moved within a conference area, but may not be allowed to leave the conference area.

It is therefore an object of the present invention to provide an asset protection device that allows the asset to be moved within a premises while being protected from leaving the premises.

It is also an object of the present invention to provide an asset protection device that allows the time that the asset could be moved to be field programmable to allow for different sized locations.

DISCLOSURE OF THE INVENTION

In accordance with these and other objects, the present invention is a method and apparatus for generating an alarm signal upon detecting movement of an object over a time that is greater than a field settable allowed movement time. The method includes the steps of locating a housing with respect to the object, setting an allowed movement time for the object, monitoring the movement of the housing, detecting a movement that exceeds the allowed movement time of the housing, generating an alarm signal, and transmitting by wireless transmission the alarm signal to a remote receiving station. The method further includes the step of producing a confirmation beep at the remote receiving station after the movement time has been set.

The apparatus in the housing includes means for monitoring the movement of the object, means for setting an allowed movement time, means for detecting a movement time greater than the allowed movement time, means for generating an alarm signal, and means for transmitting by wireless transmission the alarm signal to a remote receiving station.

Setting an allowed movement time for the object is achieved by the following steps: powering the apparatus while depressing a switch, such as a tamper switch, initiating an allowed movement time counter, moving the object an acceptable distance, releasing the tamper switch, stopping the allowed movement time counter, and reading the allowed movement time from the allowed movement time counter.

Alternative embodiments for setting the allowed movement time for the object may include using user selectable switches, connecting the apparatus to a computer via an interface connection and selecting the allowed movement time from a display on the computer that is transferred to the apparatus, or selecting the allowed movement time from a remote receiving station and wirelessly transmitting it and receiving it at the apparatus.

The method and apparatus for monitoring the movement of the object is accomplished by periodic sampling by a processor of the output of an accelerometer, such as (but not limited to) a gravitational sensor, which determines if the object is accelerating (and thus moving). The gravitational sensor may sense a change in the gravitational force on one, two, or three axes, whereby a change in the gravitational force is produced by a tilt of the object in one or more axes' directions. The processor compares the samples to a predetermined threshold and if the sample is greater than the predetermined threshold (plus a factory selected tolerance), motion has been detected. If the sample is below the predetermined threshold, then motion has not been detected.

The means for detecting a movement greater than the allowed movement time includes processing circuitry that detects a movement of the housing (as described above), enables an allowed movement time counter to count down the previously programmed allowed movement time, and enables a restore counter to count down a restore time. As the processing circuitry continues to detect movement of the housing during the restore time (as described above but at a more rapid rate) it allows the allowed movement time counter to continue to count down the allowed movement time. The processing circuitry then determines when the allowed movement time counter has completed counting the allowed movement time, generates an alarm message, and enables the transmitter to wirelessly transmit the alarm message to a remote receiving station. The restore time is less than the allowed movement time, which allows the processing circuitry to quantize the allowed movement. If the movement stops within the restore time (or the quantized time) the allowed movement time counter is reset and no alarm is generated. The processing circuitry determines if the movement has stopped within the restore time by detecting motion in less than a predetermined percentage of samples taken during the restore time.

BRIEF DESCRIPTION OF THE DRAWING

FIG. 3 is a flow chart for determining the allowed movement time during power on.

BEST MODE FOR CARRYING OUT THE INVENTION

Figure 1:
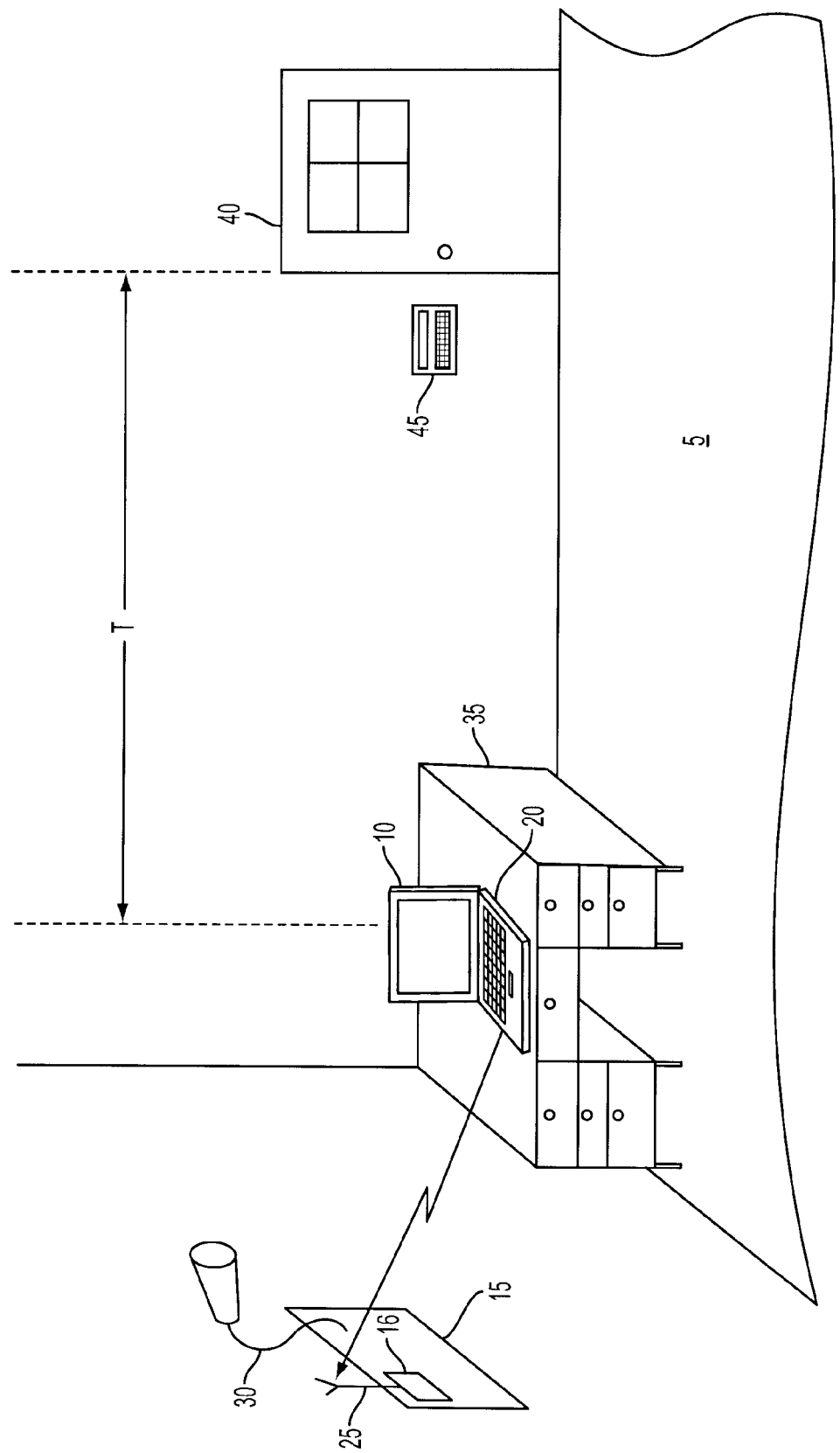
FIG. 1 is a diagram of a building with the alarm device of the present invention located in the building.

The preferred embodiments of the present invention will now be described with respect to the Figures. FIG. 1 is a diagram of a building 5 with a laptop 10 monitored by an alarm panel 15 which is located for example in a basement. A wireless receiver 16 associated with the alarm panel 15 wirelessly receives, via an antenna 25, signals transmitted from the alarm device 20, which is affixed to the laptop 10. When the alarm panel 15 receives an alarm signal via the receiver 16, the alarm panel 15 sounds the alarm 30 and/or dials a central station, etc. as known in the art. The alarm device 20 transmits an alarm signal to the alarm panel 15 when the laptop 10 has been moved for a time that is longer than for instance, the allowed movement time T that it takes to walk the laptop 10 from the desk 35 to the door 40. This allows a user to move the laptop 10 within the desk 35 area without setting off an alarm, but does not allow a user to take the laptop 10 out of the building 5, through door 40. The allowed movement time T is programmed during a set up mode where the alarm device 20 is powered up (i.e., inserting its battery in) while a tamper switch 60 (shown in FIG. 2) on the alarm device 20 is closed or depressed. The laptop 10 is moved from the desk 35 to the door 40 and the tamper switch 60 is then released. The time between closing and releasing the tamper switch 60 is called the allowed movement time (T), and it is stored by the alarm device 20, and a confirmation beep on console 45 is sounded as a result of a signal sent to the alarm panel 15 by methods well known in the art. The preferred embodiment allows for a maximum allowed movement time (T) of 2 minutes although other maximum times may be used if desired. If the alarm device 20 does not detect a set up mode during initial power up it simply uses a default value, selected during manufacture, as the allowed movement time. This default value is used until the alarm device 20 goes through the set up mode, after which the programmed time is used.

Figure 2:
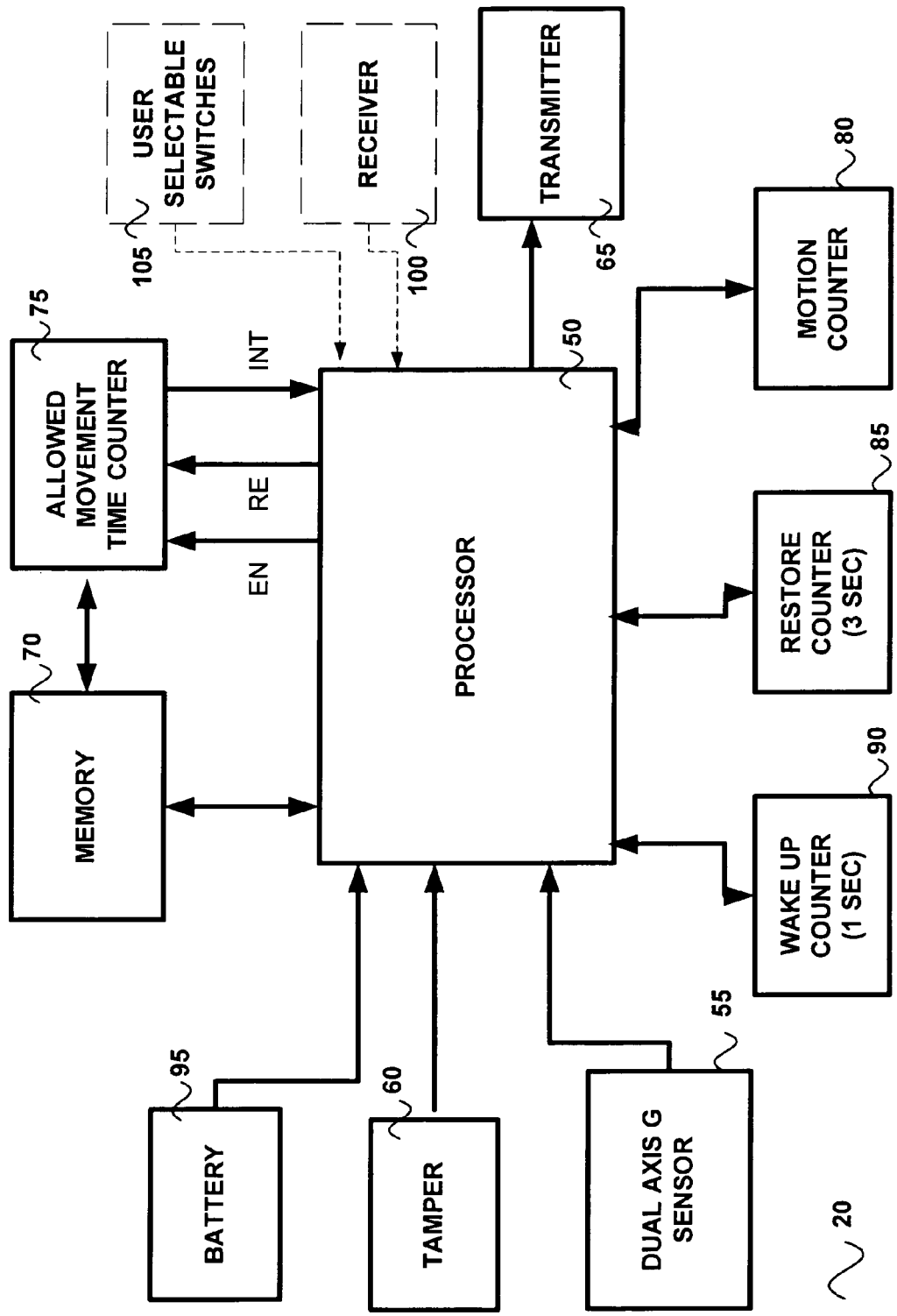
FIG. 2 is a block diagram of the alarm device of the present invention.

FIG. 2 shows a block diagram of the alarm device 20. Upon power up from battery 95 the processor 50 receives switch information from tamper device 60 to determine the allowed movement time, which is counted by the allowed movement time counter 75 and stored in memory 70. Once the allowed movement time is determined as described below, the processor 50 begins normal operation.

The setting of the allowed movement time may also be accomplished in a number of alternative embodiments. The present invention includes setting the allowed movement time by setting user selectable switches 105, by downloading the allowed movement time from a computer, or by downloading the allowed movement time from the keypad 45. In these alternative embodiments, tamper switch information would not be necessary and the allowed movement time counter 75 would not have to count the time in order for the allowed movement time to be stored in memory 70. In the alternative embodiment of the user selectable switches 105, the processor 50 would read the user selectable switches 105 and store the information in memory 70. In the alternative embodiments of the allowed movement time being transmitted from a computer or the keypad 45, the receiver 100 would receive the transmitted information. The processor 50 would read the received information and store it in memory 70. Also, one skilled in the art will understand that the counting of the allowed movement time by allowed movement time counter 75 may be initiated in a variety of ways besides depressing and releasing tamper switch 60. For example, one could power up and tap the alarm device 20 on a table three times within ten seconds of power up to start the allowed movement time counter 75 and then tap it tree times to stop the allowed movement time counter 75.

During the normal operation, also further described below, the processor 50 maintains a sleep mode until woken up by the wake up counter 90 every second for power conservation. When the processor 50 is woken up it samples (10 times for the preferred embodiment) the output of the G sensor 55 ten times to determine if there is motion. The G sensor 55 is a MEMS dual axis accelerometer (for example, ANALOG DEVICES, part no. ADXL202E) that will measure +/−2G in both the x and y-axes. In an alternative embodiment the alarm device 20 may utilize three axes (x, y, and z) or even just a single axis (x, y, or z) as desired. The G sensor has two outputs, GX and GY, that represent the measured G force as a function of the tilt of the sensor 55 with respect to the horizon (0 degrees is parallel to the horizon and +/−90 degrees is pointing towards the earth). The processor 50 analyzes the 10 samples for any variations among the 10 samples and for any changes from the previous 10 samples to the present 10 samples. If there are no changes the alarm device 20 returns to the sleep mode.

If the processor 50 determines movement may be occurring, it goes into an active state where it starts the allowed movement time counter 75 to count down the allowed movement time previously stored in memory 70 and collects a number of samples (ten for the preferred embodiment) every 4 milliseconds. The processor 50 determines if each sample shows motion and increases the motion counter 80 every time it does. The processor 50 determines if there is motion as described above. The processor is interrupted from the sampling every 3 seconds (for the preferred embodiment) by the restore counter 85 to determine if the motion has stopped. The processor 50 determines this by reading the motion counter 80 and determining if there is no motion in 80% of the samples. If the motion has stopped the allowed movement time counter 75 is reset or disabled. If the motion has not stopped, the allowed movement time counter 75 continues to count down unit it has finished. At this point the allowed movement time counter 75 interrupts the processor 50, which causes the processor 50 to send an alarm message to transmitter 65.

Figure 3:
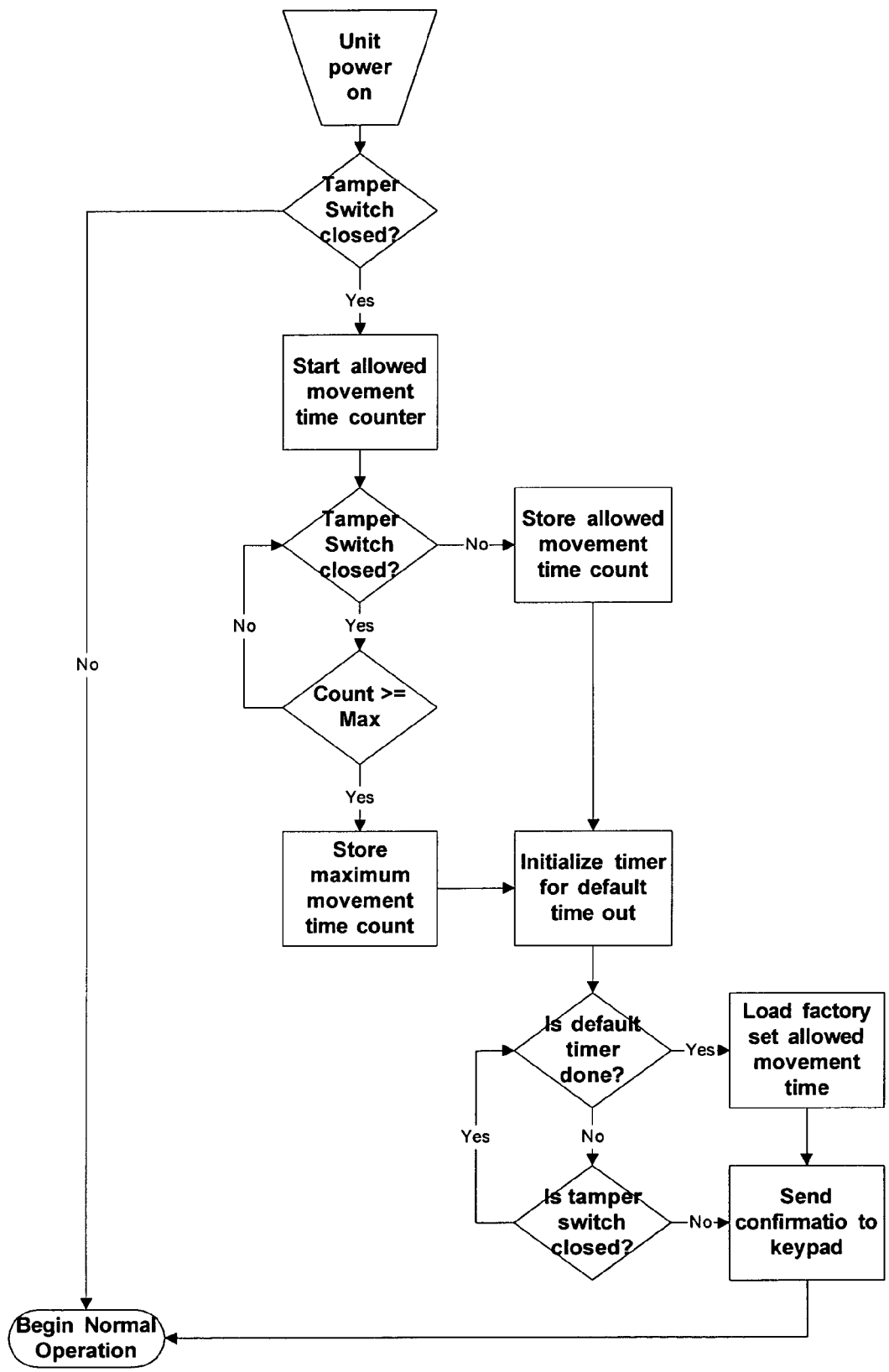

FIG. 3 shows the flowchart for setting the allowed movement time. The alarm device 20 is powered on by inserting its battery 95 in. If the tamper switch 60 is not closed the alarm device 20 begins normal operation. If the tamper switch 60 is closed, the allowed movement time counter 75 is started. The processor 50 monitors the tamper switch 60 to determine when it has released. If it is released before the maximum allowed movement time count is reached, the processor 50 stores in memory 70 the value of the counter 75 as the allowed movement time count. If the maximum time count is reached the processor 50 stores the maximum allowed movement time which is 2 minutes in the preferred embodiment. After storing the allowed movement time, the processor 50 determines if the tamper switch 60 is held long enough, which is 3 minutes for the preferred embodiment, for the allowed movement time to be reset to the factory default value. The processor 50 initializes and starts an internal timer to count down the default time. The processor 50 then checks if the default timer is done. If it is not it checks if the tamper switch 60 is still closed. In the case of a normal allowed movement time (less than 2 minutes) the tamper switch 60 will not be closed and the processor 50 with cause the transmitter 65 to transmit a message to the console 15 which will cause the keypad 45 to produce a confirmation beep. In this case the allowed movement time will be the stored count from the movement time counter 75. In the case of a maximum allowed movement time, the tamper switch 60 will be released before the default timer is finished and the confirmation message will be transmitted. In this case the allowed movement time will be the stored maximum movement time count. Finally, if the default timer times out, the processor 50 resets the stored allowed movement time to a factory selected allowed movement time and transmits the confirmation message. Once the confirmation message is sent, the alarm device 20 goes into a normal operation mode.

Figure 4:
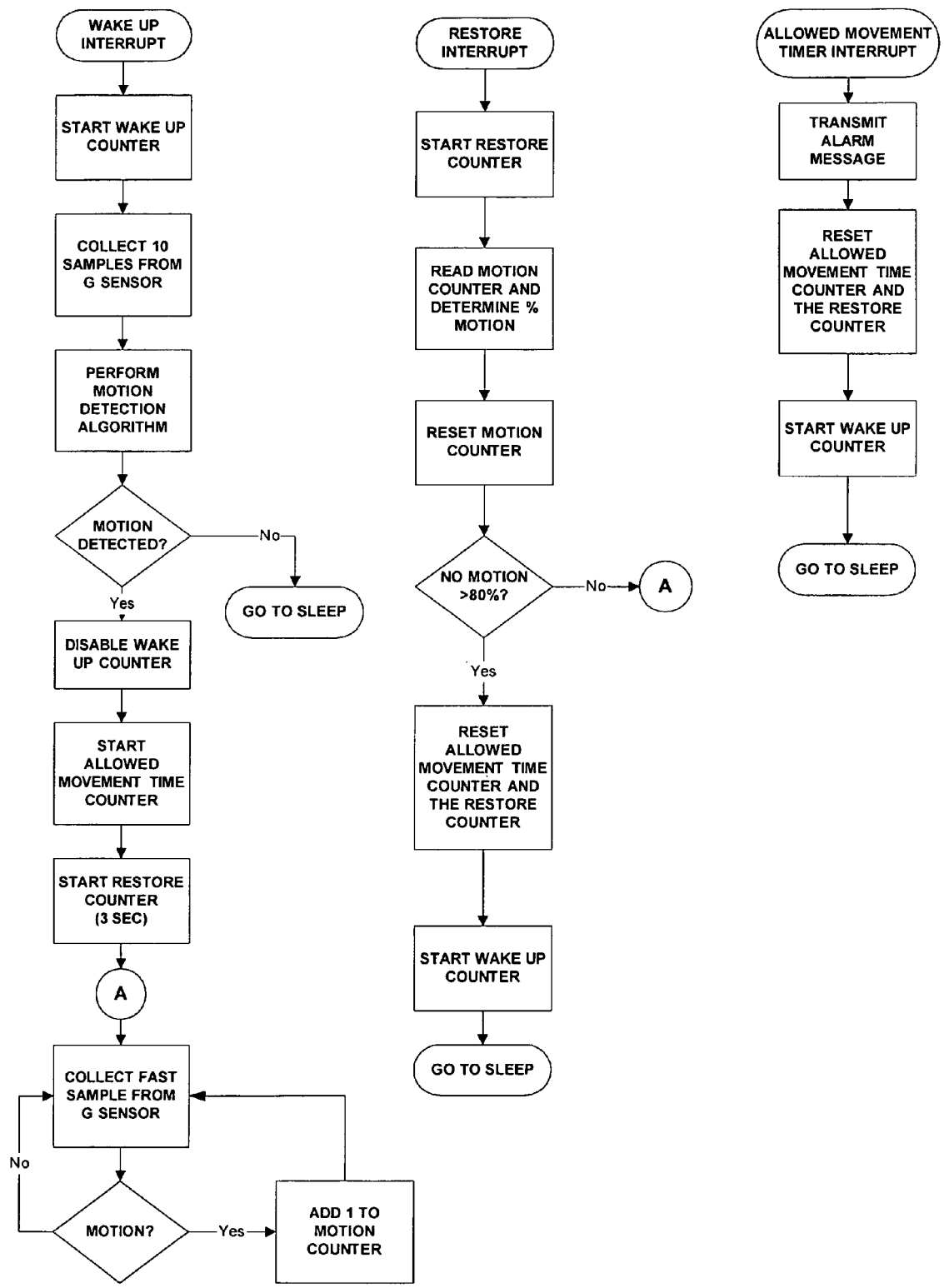
FIG. 4 is a flow chart for the normal operation of the present invention.

FIG. 4 shows a flow chart for the normal operation of the alarm device 20 after the allowed movement time has been selected. The processor 50 is in a sleep mode until it is interrupted by wake up counter 90 every second. The processor 50 collects ten samples from G sensor 55 and performs the motion detection algorithm. If motion is not detected the processor 50 goes back to sleep. If motion is detected, the wake up counter 90 is disabled, the allowed movement time counter 75 is started, and the restore counter 85 is started. At this point the processor 50 begins the fast sample motion detection algorithm where it samples the G sensor outputs every 4 milliseconds and where it increases the motion counter 80 each time motion is detected in a fast sample. The fast sampling continues until the restore counter 85 counts-three seconds and interrupts the processor 50. Once the restore counter 85 interrupts the processor 50, the processor 50 starts the restore counter again and determines if there has been motion in the last three seconds by reading the motion counter 80 and determining the percentage of fast samples that show motion. The motion counter is reset, and if 80% or more of the fast sample show no motion, then the processor 50 resets and disables the allowed movement time counter 75 and the restore counter 85, starts the wake up counter 90, and goes to sleep. If there has been motion, then the processor 50 continues the fast sample motion detection algorithm (and does not reset the allowed movement time counter 75). If the allowed movement time counter 75 is not reset before it finishes counting down (due to constant motion) then the allowed movement time counter 75 interrupts the processor 50, which causes the processor 50 to send an alarm message to transmitter 65. The processor 50 then resets and disables the allowed movement time counter 75 and the restore counter 85, starts the wake up counter 90, and goes to sleep.

It will be apparent to those skilled in the art that modifications to the specific embodiment described herein may be made while still being within the spirit and scope of the present invention. For example, a different accelerometer than the G sensor 55 may be used, and the monitoring rate of the G sensor 55 may be greater or smaller than one second. The G sensor 55 may be a 1-axis, or a 3-axes sensor rather than a 2-axes sensor. The fast samples may also be taken at a different rate than 4 milliseconds. The processing may be performed differently than shown in the flowchart. The restore counter 85 may count a larger or smaller time than 3 seconds, and the determination of no motion during the restore time count may use a percentage that is greater than or less than 80%. In addition, an alternative motion sensor technology such as a magnetometer may be used as described in the aforementioned U.S. Pat. No. 6,724,316 B2.

What is claimed is:

1. A method of monitoring movement of an object comprising:
   a) programming a movement-detecting device with an allowed movement time by
      i) applying power to the movement-detecting device while depressing a tamper switch to initiate an allowed movement time counter,
      ii) moving the movement-detecting device an acceptable distance,
      iii) releasing said tamper switch to stop said allowed movement time counter, and
      iv) reading said allowed movement time from said allowed movement time counter and storing said allowed movement time in memory;
   b. locating the movement-detecting device with respect to the object, detecting if the movement-detecting device is being moved,
   c. if the movement-detecting device is being moved, then determining if the movement-detecting device movement is for a time period that exceeds the allowed movement time stored in memory,
   d. if the movement-detecting device is being moved for a time period that exceeds the allowed movement time, then transmitting an alarm signal.

2. The method of claim 1 wherein the step of detecting if the movement-detecting device is being moved comprises the step of sampling an output signal from an accelerometer at a predetermined time interval.

3. The method of claim 1 wherein the step of determining if the movement-detecting device movement is for a time period that exceeds the allowed movement time comprises the steps of:
   a. enabling an allowed movement time counter to count down the allowed movement time,
   b. enabling a restore counter to count down a restore time, wherein said restore time is less than said allowed movement time,
   c. detecting movement of the movement-detecting device during said restore time,
   d. allowing said allowed movement time counter to continue to count down the allowed movement time when movement of the movement-detecting device has been detected during said restore time, and
   e. determining when said allowed movement time counter has completed counting said allowed movement time.

4. A movement-detecting device comprising:
   means for detecting movement of the movement-detecting device,
   means for programming an allowed movement time,
   means for determining if the movement-detecting device movement is for a time period that exceeds the allowed movement time, and
   means for transmitting an alarm signal if the movement-detecting device movement is determined to be for a time period that exceeds the allowed movement time;
   wherein said means for programming an allowed movement time comprises:
      i. an allowed movement time counter,
      ii. a tamper switch for initiating and stopping the counter, wherein the tamper switch is depressed while applying power to initiate the allowed movement time counter and released to stop the allowed movement time counter, iii. processing means for reading and storing a count from the allowed movement time counter after said tamper switch is released, and iv. memory means for storing the allowed movement time count.

5. The movement-detecting device of claim 4 wherein said means for detecting the movement of the movement-detecting device comprises an accelerometer.

6. The movement-detecting device of claim 5 wherein said accelerometer comprises a gravitational sensor.

7. The movement-detecting device of claim 6 wherein said gravitational sensor measures movement along two axes.

8. The movement-detecting device of claim 6 wherein said gravitational sensor measures movement along three axes.

9. The movement-detecting device of claim 6 wherein said gravitational sensor measures movement along one axis.

10. The movement-detecting device of claim 4 wherein said means for determining of the movement-detecting device movement is for a time period that exceeds the allowed movement time comprises processing circuitry that a. enables an allowed movement time counter to count down the allowed movement time, b. enables a restore counter to count down a restore time, wherein said restore time is less than said allowed movement time, c. detects movement of the movement-detecting device during said restore time, d. allows said allowed movement time counter to continue to count down the allowed movement time when movement of the movement-detecting device has been detected during said restore time, and e. determines when said allowed movement time counter has completed counting said allowed movement time.

11. An apparatus for generating an alarm signal upon detecting movement of an object over a time that is greater than a field settable allowed movement time comprising:

a. a sensor for providing position data of an object, b. memory for storing an allowed movement time, c. an allowed movement time counter for counting the allowed movement time stored in the memory, d. a processor programmed to:
 i. read the position data of the object from the sensor,
 ii. determine if there has been motion based on the position data, and
 iii. if there has been motion, then
  1. initiate the allowed movement time counter to count the allowed movement time,
  2. determine if the motion has continued past the allowed movement time, and
  3. if the motion has continued past the allowed movement time, generate an alarm message, and e. a transmitter for receiving the alarm message and transmitting the alarm signal;

further comprising a tamper switch for initiating and stopping the allowed movement time counter, wherein the tamper switch is depressed during power on to initiate the allowed movement time counter and released to stop the allowed movement time counter and wherein the processor reads the allowed movement from the allowed movement time counter after the tamper switch has been released and stores the allowed movement time in the memory.

12. The apparatus of claim 10 wherein the sensor comprises an accelerometer.

13. The apparatus of claim 12 wherein the accelerometer comprises a gravitational sensor.

14. The apparatus of claim 11 further comprising a restore counter and a motion counter, wherein the restore counter counts a restore time and the motion counter counts the number of times the position data shows motion within the restore time and wherein the processor determines if there has been motion based on the number of times the position data shows motion within the restore time.

15. The apparatus of claim 14 wherein the processor determines there has not been motion when 80% of the position data read during the restore time shows no motion.

* * * * *